United States Patent
Sofia

(10) Patent No.: US 11,138,343 B2
(45) Date of Patent: Oct. 5, 2021

(54) MULTIPLE SIGNATURES IN METADATA FOR THE SAME DATA RECORD

(71) Applicant: International Business Machines Corporation, Armonk, NY (US)

(72) Inventor: Anthony Thomas Sofia, Hopewell-Junction, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 336 days.

(21) Appl. No.: 16/251,243

(22) Filed: Jan. 18, 2019

(65) Prior Publication Data

US 2020/0233978 A1 Jul. 23, 2020

(51) Int. Cl.
| | |
|---|---|
| *G06F 21/00* | (2013.01) |
| *G06F 21/64* | (2013.01) |
| *G06F 21/62* | (2013.01) |
| *G06F 16/23* | (2019.01) |
| *G06F 16/2457* | (2019.01) |
| *H04L 9/32* | (2006.01) |

(52) U.S. Cl.
CPC ............ *G06F 21/64* (2013.01); *G06F 16/235* (2019.01); *G06F 16/2358* (2019.01); *G06F 16/24573* (2019.01); *G06F 21/6209* (2013.01); *H04L 9/3247* (2013.01)

(58) Field of Classification Search
CPC .. G06F 21/64; G06F 16/24573; G06F 16/235; G06F 16/2358; G06F 21/6209; H04L 9/3247
See application file for complete search history.

(56) References Cited

U.S. PATENT DOCUMENTS

| | | | | |
|---|---|---|---|---|
| 6,049,671 | A | * | 4/2000 | Slivka ........................ G06F 8/61 717/173 |
| 6,564,215 | B1 | | 5/2003 | Hsiao et al. |
| 7,539,869 | B1 | * | 5/2009 | Mullan .................... G06F 21/64 380/285 |
| 9,864,878 | B2 | | 1/2018 | Sofia et al. |
| 2002/0038318 | A1 | | 3/2002 | Cochran et al. |
| 2003/0120925 | A1 | * | 6/2003 | Rose ................. G06Q 20/40975 713/176 |
| 2006/0136708 | A1 | * | 6/2006 | Hajji ...................... G06F 21/575 713/2 |

(Continued)

OTHER PUBLICATIONS

DocuSign, DocuSign Signature Appliance Client User Guide, DocuSign, Inc., Version 8.0, pp. 1-173 (Year: 2003).*

(Continued)

*Primary Examiner* — Ghodrat Jamshidi
(74) *Attorney, Agent, or Firm* — Cantor Colburn LLP; Teddi Maranzano

(57) ABSTRACT

Aspects include accessing, by a processing system, one or more data records and a metadata record. The metadata record includes a first digital signature associated with the one or more data records. One or more additional digital signatures associated with the one or more data records are generated, where the first digital signature and the one or more additional digital signatures are generated based on applying at least one different digital signature generation aspect with respect to the one or more data records. The one or more additional digital signatures are stored in the metadata record.

20 Claims, 5 Drawing Sheets

(56) References Cited

U.S. PATENT DOCUMENTS

| | | | |
|---|---|---|---|
| 2008/0016358 A1 | 1/2008 | Filreis et al. | |
| 2008/0162501 A1* | 7/2008 | Tysowski | G06F 16/40 |
| 2009/0320012 A1* | 12/2009 | Lee | G06F 8/65 |
| | | | 717/168 |
| 2009/0327732 A1* | 12/2009 | Buhler | H04L 9/3247 |
| | | | 713/176 |
| 2013/0290725 A1* | 10/2013 | Hogan | H04L 9/3247 |
| | | | 713/176 |
| 2014/0130183 A1* | 5/2014 | Furuichi | G06F 21/62 |
| | | | 726/27 |
| 2017/0054736 A1 | 2/2017 | Krishnamurthy | |
| 2019/0245682 A1* | 8/2019 | Alwen | H04L 9/085 |
| 2019/0289019 A1* | 9/2019 | Thekadath | H04L 9/3239 |

OTHER PUBLICATIONS

Gersch et al., "Deploying dns security (dnssec) in large-scale operational environments." Conference for Homeland Security, 2009. CATCH'09. Cybersecurity Applications & Technology. IEEE, 2009, 12 pages.

Jannen et al. "BetrFS: A Right-Optimized Write-Optimized File System." FAST. 2015, 16 pages.

Schoder et al., . "VeriStream—a framework for verifiable data streaming." International Conference on Financial Cryptography and Data Security. Springer, Berlin, Heidelberg, 2015, 26 pages.

Schroder et al., . "Verifiable data streaming." Proceedings of the 2012 ACM conference on Computer and Communications security. ACM, 2012, 10 pages.

Tang et al. "Outsourcing multi-version key-value stores with verifiable data freshness." Data Engineering (ICDE), 2014 IEEE 30th International Conference on. IEEE, 2014, 4 pages.

* cited by examiner

MULTIPLE SIGNATURES IN METADATA FOR THE SAME DATA RECORD

BACKGROUND

The present invention relates to computer systems, and more particularly, to computer systems, computer-implemented methods, and computer program products configured to support multiple signatures in metadata for the same data record.

In systems such as a server, an event logger may capture an event record corresponding to an event, such as a system event associated with an operation of the server. Enterprises may audit such logged event records as part of regulatory compliance. For compliance, the audit may have to verify that contents of the event record have remained unmodified or that any changes have been tracked. Use of a digital signature associated with contents of a data record for tamper verification or other security uses can become less secure over time.

SUMMARY

According to one or more embodiments of the present invention, a computer-implemented method includes accessing, by a processing system, one or more data records and a metadata record. The metadata record includes a first digital signature associated with the one or more data records. One or more additional digital signatures associated with the one or more data records are generated, where the first digital signature and the one or more additional digital signatures are generated based on applying at least one different digital signature generation aspect with respect to the one or more data records. The one or more additional digital signatures are stored in the metadata record.

Other embodiments of the invention implement the features of the above-described method in a computer system and in a computer program product.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
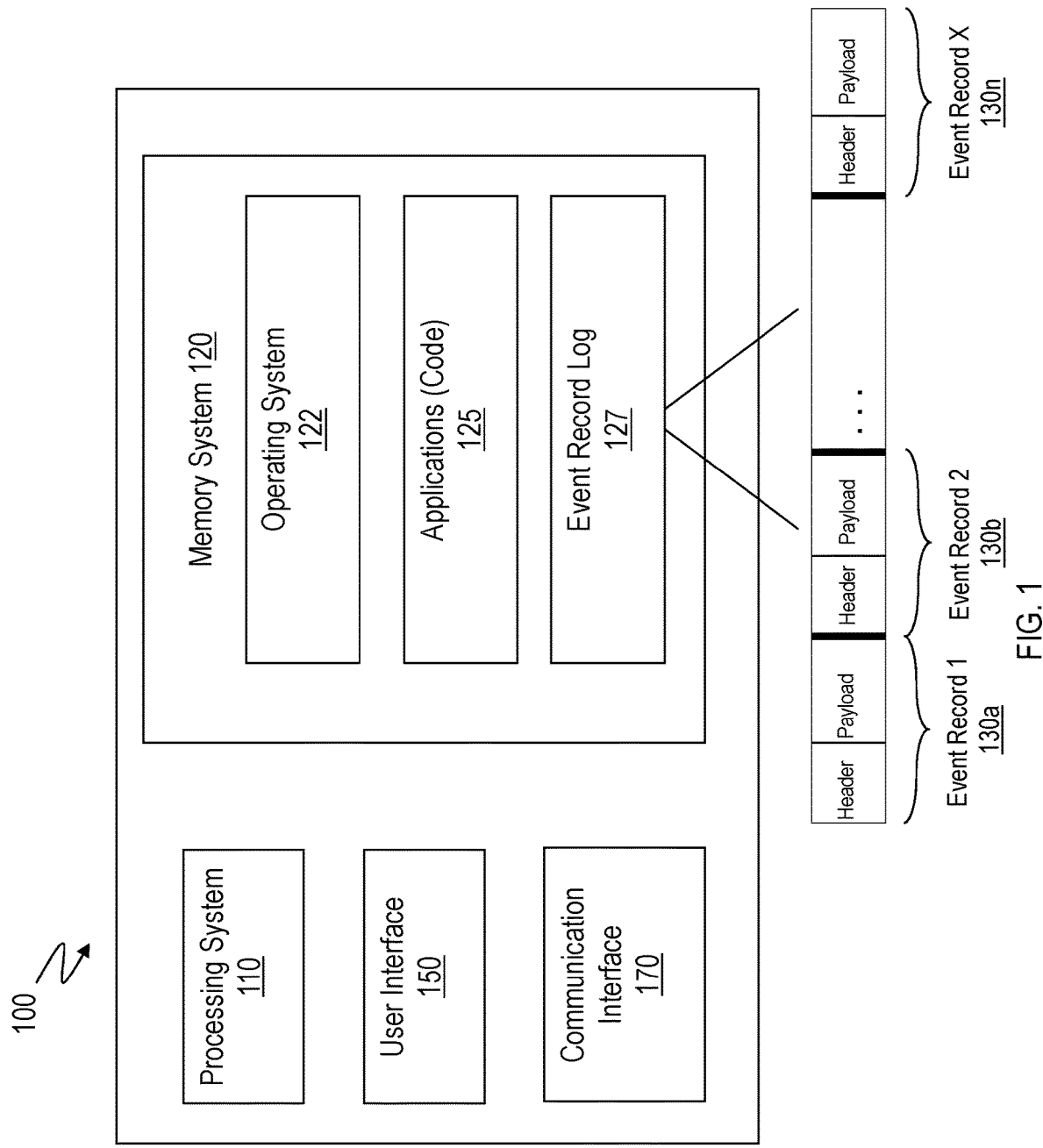
FIG. 1 is a block diagram illustrating a computer system in accordance with various embodiments of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, a digital signature can be used to sign a data record to later verify the authenticity of the data record and/or any tampering with the contents of the data record. The digital signature can be stored in a metadata record that is associated with the data record. The metadata record can be a self-described entity. Over time, digital signature generation algorithms may become less secure for a given public/private key pair. Security issues may arise, for example, as computers become faster, and the computation of signatures to break a key and gain unauthorized access to private key material can become feasible. In some instances, a metadata record storage structure may not be sized to support updated digital signatures of an expanded size that would reduce the risk of successful unauthorized access to or modification of the contents of a signed data record.

Turning now to an overview of the aspects of the invention, one or more embodiments of the invention address the above-described shortcomings of the prior art by using multiple digital signatures in a metadata record that already exists and has been generated on behalf of existing data records. In the context of a tamper-evident log, for example, data can be hashed, and the subsequent hash can have a cryptographic operation performed on it (e.g., with a private key or a public key depending if the data is being signed or verified). As data is verified, the data can be output to an output data set for further processing using the metadata record. In embodiments, the metadata records can be resized as part of the verification process in order to support holding one or more additional signatures, such as a second (or third, etc.) signature. In the event that a new signature cannot be held due to size limitations of the existing metadata record, then the old signature(s) can be removed to make room for the new signature.

The above-described aspects of the invention address the shortcomings of the prior art by adding the ability to re-sign data in place. Embodiments can perform an existing verification function on a data set of records. As part of an existing verification function, hashing of the records can be performed as the input into a public key cryptographic operation. The result can be compared with a signature that is currently stored in the metadata record. When the hash is computed, it can be signed with a new signature algorithm. If the hashing method does not change, the same hash used for validation can be re-used; otherwise, a second hash can be calculated for the data to build a new signature. Multiple signatures can apply to a single source record. The signatures can vary based on applying at least one different digital signature generation aspect between signature generation, such as a difference between one or more of: a hash function, an encryption algorithm, and/or a key used in generating a first digital signature and one or more additional digital signatures. During the next validation process, the signature used during validation can be selected. Either the original or secondary signature(s) can be used individually or a combination of signatures can be validated. The data can be considered valid upon signature validation. In some embodiments, a user may configure an older signature to no longer be validated while validation continues using a newer signature.

Embodiments of the invention can provide an ability to strip one or more older signatures out of the metadata record during a validation process. Removal or replacement of older signatures can be useful where data could otherwise be leaked by leaving vulnerable signatures in the records.

Technical effects and benefits can include enhancing the security of existing data while enabling the data to remain in place.

FIG. 1 illustrates an example system 100. The system 100 may be a computer system, such as a server computer or the like. The system 100 may include, among other components, a processing system 110, a memory system 120, a user interface 150, and a communication interface 170 for network interfacing.

The processing system 110 may include one or more processors of the system 100 responsible for the execution of an operating system 122, control instructions, and applications 125 installed on the system 100. The processing system 110 may be one or more devices operable to execute logic. The logic may include computer executable instructions or computer code embodied in the memory system 120 or in other memory that when executed by the processing system 110, cause the processing system 110 to perform the features implemented by the logic. The computer code may include instructions executable with the processing system 110. The computer code may include embedded logic. The computer code may be written in any computer language now known or later discovered, such as C++, C #, Java, Pascal, Visual Basic, Perl, HyperText Markup Language (HTML), JavaScript, assembly language, shell script, or any combination thereof. The computer code may include source code and/or compiled code. The processing system 110 may include one or more of a general processor, central processing unit, server, application specific integrated circuit (ASIC), digital signal processor, field programmable gate array (FPGA), digital circuit, analog circuit, or combinations thereof. The processing system 110 can be in communication with the memory system 120 and other components of the system 100. In one example, the processing system 110 can also be in communication with additional elements, such as the user interface 150 and the communication interface 170.

The memory system 120 can be a non-transitory computer storage medium. The memory system 120 can include DRAM, SRAM, Flash or any other type of memory or a combination thereof. The memory system 120 may store one or more operating system 122 and applications 125 that are executable by the processing system 110. The operating system 122 and the applications 125 may be stored on the memory system 120 by the manufacturer, provider, or end-user of the system 100. The memory system 120 may contain other data such as images, videos, documents, spreadsheets, audio files, and other data that may be associated with operation of the system 100. For example, the memory system 120 can be used to store an event record log 127.

The user interface 150 may include a display, a speaker, a keyboard, a mouse, or any other component that facilitates user interaction. The display may be touch screen enabled. The user interface 150 may, alternatively, or in addition, a microphone or any other component that may facilitate user interaction. The user interface 150 can include circuitry, such as processor, memory, communication interfaces, integrated circuits, antennas, resistors, capacitors, and any other hardware components. The user interface 150 may also involve software. For example, the user interface 150 may include instructions and/or data that may be stored on the memory. The instructions and/or data may control operations of the user interface 150. The instructions may be computer executable. The data may include parameters and/or preset conditions associated with the user interface 150.

The event record log 127 can include one or more event records 130*a*-130*x*. An event record 130 can include a data record describing an operation of the system 100, for instance. The operating system 122, using the processing system 110, can record the event records 130*a*-130*x* in response to an operation being initiated and/or completed. For example, the event may be a startup event of the system 100, a file creation event, a file copy event, a user login event, or any other event that the operating system 122 may detect. The operating system 122 can be configured to detect a predetermined type of events. For example, the operating system 122 may be configured to detect 'file' type events such as a file creation event, a file copy event, a file move event, a file deletion event, a file modification event, or any other file event. In addition or alternatively, the operating system 122 may be configured to detect 'user' type events, such as a user login event, a user logout event, a user profile change event and other user events. Other event types are possible and above are just a few examples.

The event records 130*a*-130*x* can be stored using a predetermined format. For example, an event record may include a header and a payload. The payload can include a description of a corresponding event. For example, if the corresponding event is a file event, the payload can include a file identification, a file location, an indication of the operation performed, and other information describing the event. The header can include metadata that describes the payload, such as a length of the payload, a timestamp, or the like. The event records 130*a*-130*x* can be stored in one or more files. Alternatively, the event records 130*a*-130*x* may be entries within a file or a stream, such as a log stream.

The event record log 127 can be used to validate the operation of the system 100. For example, the operating system 122 may include System Management Facilities (SMF). SMF Enterprises can use the event record log 127 to show regulatory compliance. For example, to be compliant, the system 100 may have to perform operations in a predetermined manner. The SMF can facilitate querying the event record log 127, such as via an Application Programming Interface (API), to ensure that the system 100 was complaint with the predetermined manner of operations. In this regard, the SMF or a system auditor can operate according to the predetermined format of the event records 130*a*-130*x*. Hence, modifying the predetermined format may cause the system auditor and the SMF to cease from current operations.

Regulatory compliance may make it vital for the SMF to ensure that the event records in the event record log 127 have not been tampered with. Addition of such tamper detection record, as described herein, may cause the SMF and system auditor to be modified, thus leading to additional use of resources. The examples described herein provide technical solutions to this technical problem.

Figure 2:
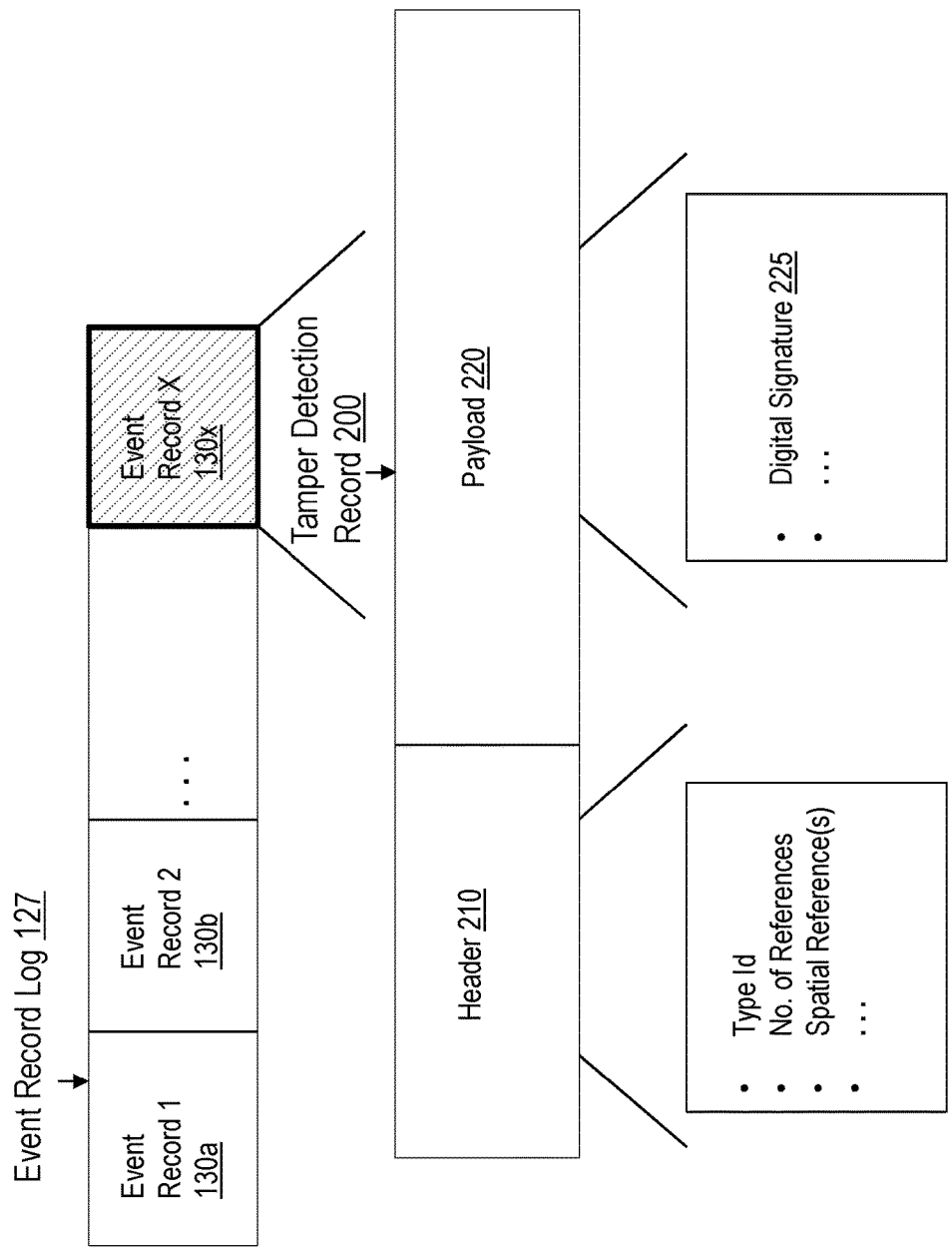
FIG. 2 is a block diagram illustrating a record log with a tamper detection record according to a non-limiting embodiment of the invention.

FIG. 2 illustrates an example of the event record log 127 including a tamper detection record 200 and is described with continued reference to FIG. 1. For example, the processing system 110 may generate the event record 130*a*. In response, the operating system 122 may additionally generate metadata that includes tamper detection information for the event record 130*a*. The operating system 122 may record or format the tamper detection information as a separate event record 130*x*, also referred to as the tamper detection record 200. The operating system 122 may subsequently record the tamper detection record 200 in the event record log 127. Thus, the processing system 110 may insert a separate record in the event record log 127 that contains the tamper detection information of the event record 130*a*. The tamper detection record 200 may use the same predetermined format of the event records 130*a*, 130*b*.

For example, as shown in FIG. 2, the tamper detection record 200 includes a header 210 and a payload 220. The payload 220 can include a digital signature 225 for the corresponding event record 130*a*. The digital signature 225 can demonstrate the authenticity of the corresponding event record 130*a*. In an example, the digital signature 225 can be encrypted, such as using asymmetric cryptography or any other type of encryption techniques. For example, the digital signature 225 may be based on contents of the event record 130*a*, a private key, a public key, a timestamp, or other information of the event associated with the event record 130*a*. In an example, the contents of the event record 130*a* may be hashed, such as using a hashing scheme prior to encryption. To validate the event record 130*a*, the operating system 122 may decrypt the digital signature 225 in the payload 220 and compare it with the contents of the event record 130*a*. The header 210 may include metadata of the payload 220. For example, the header 210 may include a length of the payload 220 or a timestamp. In addition, the header 210 may include an identifier that indicates that the payload 220 contains tamper detection information rather than a description of an event as is the case with a typical event record.

In an example, the operating system 122 may associate the tamper detection record 200 with a single event record, such as the event record 130*a*. For example, the header 210 may include a spatial reference of the event record 130*a*. The spatial reference may be a memory location of the event record 130*a*. Alternatively or in addition, the spatial reference may be a spatial relation between the tamper detection record 200 and the corresponding event record 130*a*. For example, the spatial relation can be a predetermined relation based on the memory locations of the records. In such a case, the spatial reference of the first event record 130*a* can be implicitly identified based on the predetermined relation and the memory location of the second event record 130*b*, thus, avoiding explicitly saving a spatial reference in the tamper detection record 200.

The spatial reference can be either explicitly stored, or the spatial reference can be implicit. If the spatial reference is explicit, the location of the first event record 130*a* can be stored in the tamper detection record 200. The location may be a location of the first event record 130*a* in memory or in a file. When the spatial reference is implicit, the spatial reference can be with relation to the data in memory or a file. The system 100 may use a predetermined spatial relation between the first event record 130*a* and the tamper detection record 200. For example, according to the predetermined spatial relation, the first event record 130*a* may precede the tamper detection record 200 with no other records in between. Alternatively, the predetermined spatial relation permits other event records of the same type as the first event record 130*a* in between the first event record 130*a* and the tamper detection record 200. In an example, the other event records cannot be included in the tamper-resistant data, which is the payload 220, of the tamper detection record 200.

In an example, the operating system 122 may associate the tamper detection record 200 with more than one event record in the event record log 127, such as with the event records 130*a* and 130*b*. Accordingly, the header 210 may include spatial references to each event record that is associated with the tamper detection record 200. Additionally, the header 210 may include a number of event records that the tamper detection record 200 is associated with and the length of each respective digital signature 225 included in the payload 220. In an example, the operating system 122 may associate the tamper detection record 200 with a predetermined number of successive event records in the event record log 127. For example, the tamper detection record 200 may be associated with five successive event records, or ten successive event records, or any other predetermined number of event records. Alternatively or in addition, the number of event records associated with the tamper detection record 200 may be dynamically determined based on a number of event records stored in a predetermined memory range that the tamper detection record 200 is associated with. The spatial reference in the header 210 may identify the memory range that is associated with the tamper detection record 200.

In another example, the operating system 122 may associate the tamper detection record 200 with events of a selected type, such as file type events, user type events, or any other type of events. For example, consider that the tamper detection record 200 is associated with file type events. If the operating system 122 generates the event record 130a in response to a file type event, the operating system 122 may associate the event record 130a with the tamper detection record 200. The header 210 of the tamper detection record 200, in such a case, may indicate an identifier of the type of event records that are associated with the tamper detection record 200. In the above example, the header 210 may include an identifier of the file type event. The operating system 122 may associate each file type event record with the tamper detection record 200.

In yet another example, the operating system 122 may associate the tamper detection record 200 with a set of consecutive event records of the same type. The memory locations of the event records in the set of consecutive event records may precede the tamper detection record 200 or vice versa. For example, in response to detecting two or more consecutive events of the same type, the operating system 122 may generate and associate the tamper detection record 200 with the event records generated corresponding to the events. For example, the operating system 122 may generate a first event record 130a and a second event record 130b that are of the same type. In this case, the operating system 122 may generate the tamper detection record 200 that is associated with the first event record 130a and the second event record 130b. In other examples, the tamper detection record 200 may be associated with more than two event records of the same type.

In embodiments, after the event record log 127 is created and stored, for example, in memory system 120, it may be desirable to update or replace the digital signature 225. For instance, as time passes, it may be determined that the digital signature 225 should be enhanced through one or more new/updated digital signature generation algorithms. Security enhancements may be achieved by creating one or more additional digital signatures to supplement or replace instances of the digital signature 225. Further details are provided with respect to FIGS. 3-5.

Figure 3:
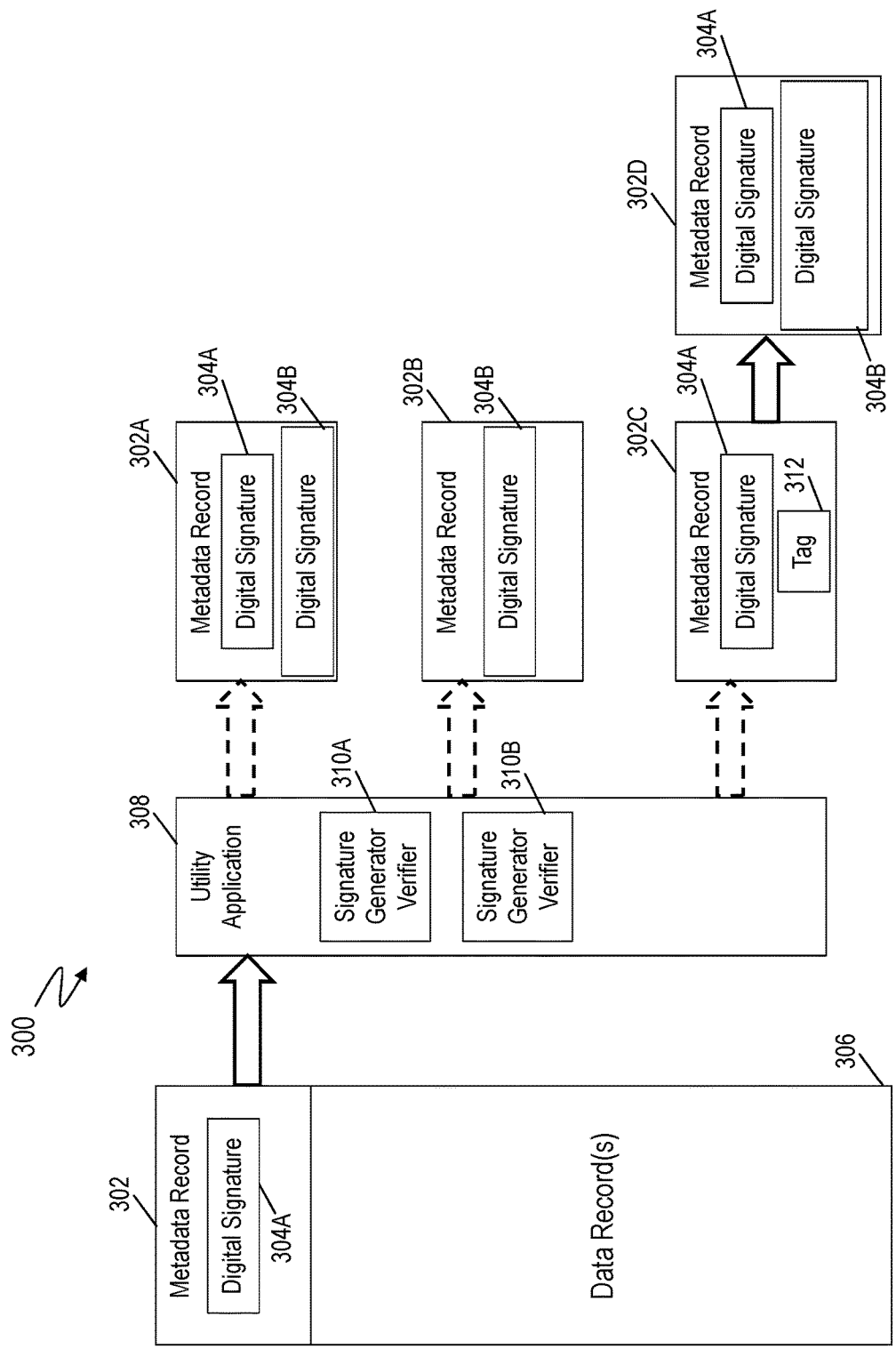
FIG. 3 is a block diagram illustrating an example of digital signature updates according to a non-limiting embodiment of the invention.

FIG. 3 depicts a block diagram 300 illustrating options for incorporating a second digital signature into a metadata record that includes a first digital signature. A metadata record 302 can include a first digital signature 304A associated with contents of one or more data records 306. For example, the metadata record 302 can be an instance of the tamper detection record 200 of FIG. 2 stored in the memory system 120 of FIG. 1, and the one or more data records 306 can be instances of one or more of the event records 130a-130x of FIG. 1 stored in the memory system 120. A utility application 308 can execute on computer resources, such as one of the applications 125 executing on the processing system 110 of FIG. 1. The utility application 308 can include a first signature generator verifier 310A and a second signature generator verifier 310B. The first signature generator verifier 310A can include algorithms used to create and verify the first digital signature 304A, which can also be used to create and verify the digital signature 225 of FIG. 2. The second signature generator verifier 310B can include algorithms used to create and verify one or more additional digital signatures 304B, where different signature generation and verification algorithms (e.g., different hash functions, encryption algorithms, and/or keys) are used by the second signature generator verifier 310B with respect to the first signature generator verifier 310A. Additional signature generator verifiers (not depicted) can be incorporated in or accessed by the utility application 308 to support additional digital signature variations (e.g., three or more digital signature variations).

The one or more additional digital signatures 304B can be larger in size than the first digital signature 304A and may include one or more security enhancements with respect to the first digital signature 304A. In embodiments, where there is sufficient available size within the metadata record 302, the utility application 308 can use the second signature generator verifier 310B to create the one or more additional digital signatures 304B based on the one or more data records 306 and store the one or more additional digital signatures 304B in the metadata record 302 as metadata record 302A. Thus, the metadata record 302A can store both the first digital signature 304A and the one or more additional digital signatures 304B associated with the same instances of the one or more data records 306. As a further variation, the utility application 308 can use the second signature generator verifier 310B to create the one or more additional digital signatures 304B based on the one or more data records 306 and store the one or more additional digital signatures 304B in the metadata record 302 as metadata record 302B. The metadata record 302B is an example of a digital signature replacement, where the first digital signature 304A is removed and the one or more additional digital signatures 304B are added to the metadata record 302B.

Another variation can include where the utility application 308 uses the second signature generator verifier 310B to create the one or more additional digital signatures 304B based on the one or more data records 306 but does not store the one or more additional digital signatures 304B in the metadata record 302, for instance, due to size constraints of the metadata record 302. The utility application 308 can create an update-needed tag 312 in the metadata record 302 as metadata record 302C. The update-needed tag 312 can be used as an indicator that the one or more additional digital signatures 304B should be added when expansion of the metadata record 302C is available, such as on a copy operation or movement between locations (e.g., within the memory system 120). When copying or moving the metadata record 302C, the utility application 308 can replace the update-needed tag 312 with the one or more additional digital signatures 304B in metadata record 302D which has a greater storage capacity than metadata record 302C. The metadata record 302C can retain the first digital signature 304A for performing verification or authentication of the one or more data records 306. The metadata record 302D may retain the first digital signature 304A, or the first digital signature 304A can be removed when the one or more additional digital signatures 304B are stored in the metadata record 302D. It will be understood that other variations are contemplated. For example, there can be separate instances of the signature verifier 310B for each of the one or more additional digital signatures 304B.

Figure 4:
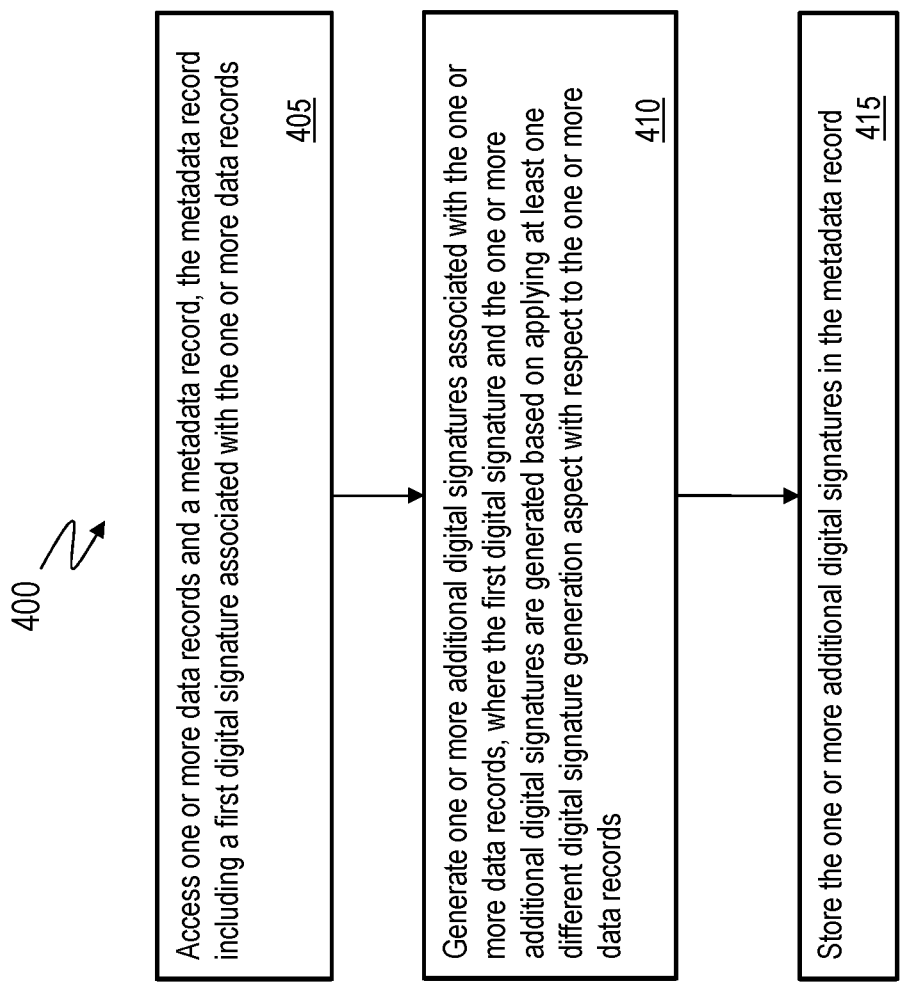
FIG. 4 is a flow diagram illustrating a method according to a non-limiting embodiment of the invention.

Turning now to FIG. 4, a flow diagram of a process 400 is generally shown in accordance with an embodiment. The process 400 is described with reference to FIGS. 1-4 and may include additional steps beyond those depicted in FIG. 4. The process 400 can be performed by the processing system 110 of FIG. 1.

At block 405, the processing system 110 can access one or more data records 306 and a metadata record 302, where the metadata record 302 includes a first digital signature 304A associated with the one or more data records 306. At block 410, the processing system 110 can generate one or more additional digital signatures 304B associated with the one or more data records 306, where the first digital signature 304A and the one or more additional digital signatures 304B are generated based on applying at least one different digital signature generation aspect with respect to the one or more data records 306. The at least one different digital signature generation aspect can include, for example, a difference between one or more of: a hash function, an encryption algorithm, and a key used in generating the first digital signature 304A and the one or more additional digital signatures 304B.

At block 415, the processing system 110 can store the one or more additional digital signatures 304B in the metadata record 302, such as depicted in the examples of metadata records 302A-302D of FIG. 3. In some embodiments, storing of the one or more additional digital signatures 304B is in performed in addition to the first digital signature 304A. Alternatively, the first digital signature 304A can be overwritten with the one or more additional digital signatures 304B in the metadata record 302B. In some embodiments, the processing system 110 can add an update-needed tag 312 to the metadata record 302 based on determining that the metadata record 302 includes an insufficient capacity to store the one or more additional digital signatures 304B in the metadata record 302. A storage capacity of the metadata record 302 can be expanded upon copying the metadata record 302 from a first storage location to a second storage location (e.g., metadata record 302C copied as metadata record 302D). The update-needed tag 312 can be replaced with the one or more additional digital signatures 304B after expanding the storage capacity of the metadata record 302. Other variations are contemplated in storing of the one or more additional digital signatures 304B. To ensure that one or more additional digital signatures 304B are being added to an authenticated record, the one or more additional digital signatures 304B can be stored in the metadata record 302 after performing a validation of the one or more data records 306 to confirm that the one or more data records 306 are unchanged based on the first digital signature 304A.

Figure 5:
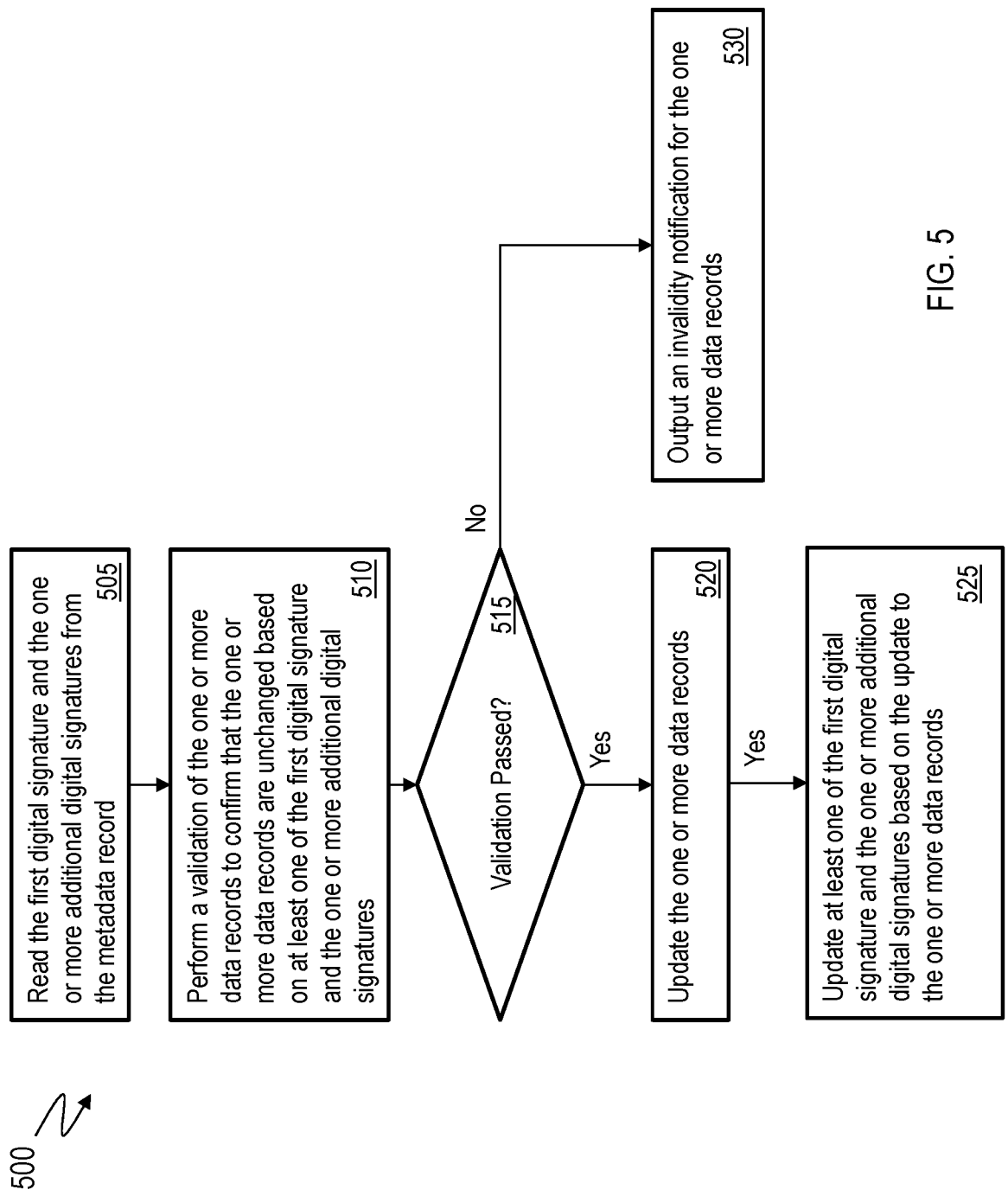
FIG. 5 is a flow diagram illustrating a method according to a non-limiting embodiment of the invention.

Turning now to FIG. 5, a flow diagram of a process 500 is generally shown in accordance with an embodiment. The process 500 is described with reference to FIGS. 1-5 and may include additional steps beyond those depicted in FIG. 5. The process 500 can be performed, for example, by the processing system 110 of FIG. 1.

At block 505, the processing system 110 can read the first digital signature 304A and the one or more additional digital signatures 304B from the metadata record 302. At block 510, the processing system 110 can perform a validation of the one or more data records 306 to confirm that the one or more data records 306 are unchanged based on at least one of the first digital signature 304A and the one or more additional digital signatures 304B. Validation can be performed using, for example, either or both of the first signature generator verifier 310A and the second signature generator verifier 310B. The first signature generator verifier 310A and the second signature generator verifier 310B can use public and private key pairs associated with the first digital signature 304A and the one or more additional digital signatures 304B and apply known validation algorithms respectively.

At block 515, the processing system 110 can determine whether the validation passed, for instance, through results of the first signature generator verifier 310A and/or the second signature generator verifier 310B. At block 520, based on determining that the validation passed, the processing system 110 can update the data records 306, and at block 525, update either or both of the first digital signature 304A and the one or more additional digital signatures 304B based on the update to the one or more data records 306. Updates to the first digital signature 304A and the one or more additional digital signatures 304B can be made by the first signature generator verifier 310A and the second signature generator verifier 310B respectively.

At block 530, based on not passing the validation, the processing system 110 can output an invalidity notification for the one or more data records 306. The invalidity notification can identify potential tampering or corruption of the one or more data records 306. Corrective actions can include reconstruction or replacement of the one or more data records 306, for instance, from a backup copy or other source.

Various validation combinations can be performed depending sizing constraints and signature characteristics. For example, the processing system 110 can read the first digital signature 304A and the one or more additional digital signatures 304B from the metadata record 302 and perform a validation of the one or more data records 306 to confirm that the one or more data records 306 are unchanged based on a combination of the first digital signature 304A and the one or more additional digital signatures 304B. As another example, the processing system 110 can read the first digital signature 304A and the one or more additional digital signatures 304B from the metadata record 302, select between the first digital signature 304A and the one or more additional digital signatures 304B as a preferred digital signature, and perform a validation of the one or more data records 306 to confirm that the one or more data records 306 are unchanged based on the preferred digital signature. The preferred digital signature can be selected based on a most recently updated digital signature identified between the first digital signature 304A and the one or more additional digital signatures 304B. As an example, digital signatures can be added to the metadata record 302 in sequential order to identify the most recent digital signature. Alternatively, the preferred digital signature can be selected based on a greater digital signature length identified between the first digital signature 304A and the one or more additional digital signatures 304B. As a further example, the preferred digital signature can be selected based on any user-based preference.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
accessing, by a processing system, one or more data records and a metadata record, the metadata record comprising a first digital signature associated with the one or more data records;
generating, by the processing system, one or more additional digital signatures associated with the one or more data records, wherein the first digital signature and the one or more additional digital signatures are generated based on applying at least one different digital signature generation aspect with respect to the one or more data records;
adding an update-needed tag to the metadata record based on determining that the metadata record comprises an insufficient capacity to store the one or more additional digital signatures in the metadata record;
expanding a storage capacity of the metadata record upon copying the metadata record from a first storage location to a second storage location;
replacing the update-needed tag with the one or more additional digital signatures after expanding the storage capacity of the metadata record; and
storing the one or more additional digital signatures in the metadata record.

2. The computer-implemented method of claim 1 further comprising:
reading the first digital signature and the one or more additional digital signatures from the metadata record; and
performing a validation of the one or more data records to confirm that the one or more data records are unchanged based on a combination of the first digital signature and the one or more additional digital signatures.

3. The computer-implemented method of claim 1 further comprising:
reading the first digital signature and the one or more additional digital signatures from the metadata record;
selecting between the first digital signature and the one or more additional digital signatures as a preferred digital signature; and
performing a validation of the one or more data records to confirm that the one or more data records are unchanged based on the preferred digital signature.

4. The computer-implemented method of claim 3, wherein the preferred digital signature is selected based on a most recently updated digital signature identified between the first digital signature and the one or more additional digital signatures.

5. The computer-implemented method of claim 3, wherein the preferred digital signature is selected based on a greater digital signature length identified between the first digital signature and the one or more additional digital signatures.

6. The computer-implemented method of claim 1, further comprising:
overwriting the first digital signature with the one or more additional digital signatures in the metadata record.

7. The computer-implemented method of claim 1, wherein the one or more additional digital signatures are stored in the metadata record after performing a validation of the one or more data records to confirm that the one or more data records are unchanged based on the first digital signature.

8. The computer-implemented method of claim 1, wherein the at least one different digital signature generation aspect comprises a difference between one or more of: a hash function, an encryption algorithm, and a key used in generating the first digital signature and the one or more additional digital signatures.

9. A system comprising:
a memory system; and
a processing system configured to perform a plurality of operations comprising:
accessing one or more data records and a metadata record stored in the memory system, the metadata record comprising a first digital signature associated with the one or more data records;
generating one or more additional digital signatures associated with the one or more data records, wherein the first digital signature and the one or more additional digital signatures are generated based on applying at least one different digital signature generation aspect with respect to the one or more data records;
adding an update-needed tag to the metadata record based on determining that the metadata record comprises an insufficient capacity to store the one or more additional digital signatures in the metadata record;
expanding a storage capacity of the metadata record upon copying the metadata record from a first storage location to a second storage location;
replacing the update-needed tag with the one or more additional digital signatures after expanding the storage capacity of the metadata record; and
storing the one or more additional digital signatures in the metadata record.

10. The system of claim 9, wherein the processing system is further configured to perform operations comprising:
reading the first digital signature and the one or more additional digital signatures from the metadata record; and
performing a validation of the one or more data records to confirm that the one or more data records are unchanged based on a combination of the first digital signature and the one or more additional digital signatures.

11. The system of claim 9, wherein the processing system is further configured to perform operations comprising:
reading the first digital signature and the one or more additional digital signatures from the metadata record;
selecting between the first digital signature and the one or more additional second digital signatures as a preferred digital signature; and
performing a validation of the one or more data records to confirm that the one or more data records are unchanged based on the preferred digital signature.

12. The system of claim 11, wherein the preferred digital signature is selected based on a most recently updated digital signature identified between the first digital signature and the one or more additional digital signatures.

13. The system of claim 11, wherein the preferred digital signature is selected based on a greater digital signature length identified between the first digital signature and the one or more additional digital signatures.

14. The system of claim 9, wherein the one or more additional digital signatures are stored in the metadata record after performing a validation of the one or more data records to confirm that the one or more data records are unchanged based on the first digital signature.

15. The system of claim 9, wherein the at least one different digital signature generation aspect comprises a difference between one or more of: a hash function, an encryption algorithm, and a key used in generating the first digital signature and the one or more additional digital signatures.

16. A computer program product comprising a non-transitory computer readable storage medium having program instructions embodied therewith, the program instructions executable by a processing system to perform a plurality of operations comprising:
  accessing one or more data records and a metadata record, the metadata record comprising a first digital signature associated with the one or more data records;
  generating one or more additional digital signatures associated with the one or more data records, wherein the first digital signature and the one or more additional digital signatures are generated based on applying at least one different digital signature generation aspect with respect to the one or more data records;
  adding an update-needed tag to the metadata record based on determining that the metadata record comprises an insufficient capacity to store the one or more additional digital signatures in the metadata record;
  expanding a storage capacity of the metadata record upon copying the metadata record from a first storage location to a second storage location;
  replacing the update-needed tag with the one or more additional digital signatures after expanding the storage capacity of the metadata record; and
  storing the one or more additional digital signatures in the metadata record.

17. The computer program product of claim 16, wherein the processing system is further configured to perform operations comprising:
  reading the first digital signature and the one or more additional digital signatures from the metadata record; and
  performing a validation of the one or more data records to confirm that the one or more data records are unchanged based on a combination of the first digital signature and the one or more additional digital signatures.

18. The computer program product of claim 16, wherein the processing system is further configured to perform operations comprising:
  reading the first digital signature and the one or more additional digital signatures from the metadata record;
  selecting between the first digital signature and the one or more additional digital signatures as a preferred digital signature, wherein the preferred digital signature is selected based on one or more of: a most recently updated digital signature identified between the first digital signature and the one or more additional digital signatures, a greater digital signature length identified between the first digital signature and the one or more additional digital signatures, and/or a user-based preference; and
  performing a validation of the one or more data records to confirm that the one or more data records are unchanged based on the preferred digital signature.

19. The computer program product of claim 16, wherein the one or more additional digital signatures are stored in the metadata record after performing a validation of the one or more data records to confirm that the one or more data records are unchanged based on the first digital signature.

20. The computer program product of claim 16, wherein the at least one different digital signature generation aspect comprises a difference between one or more of: a hash function, an encryption algorithm, and a key used in generating the first digital signature and the one or more additional digital signatures.

* * * * *